Sept. 1, 1959 W. H. RAMBO 2,902,150
MECHANISMS AND METHODS FOR THE SORTING OF LUMBER
Filed Oct. 29, 1954 4 Sheets-Sheet 3

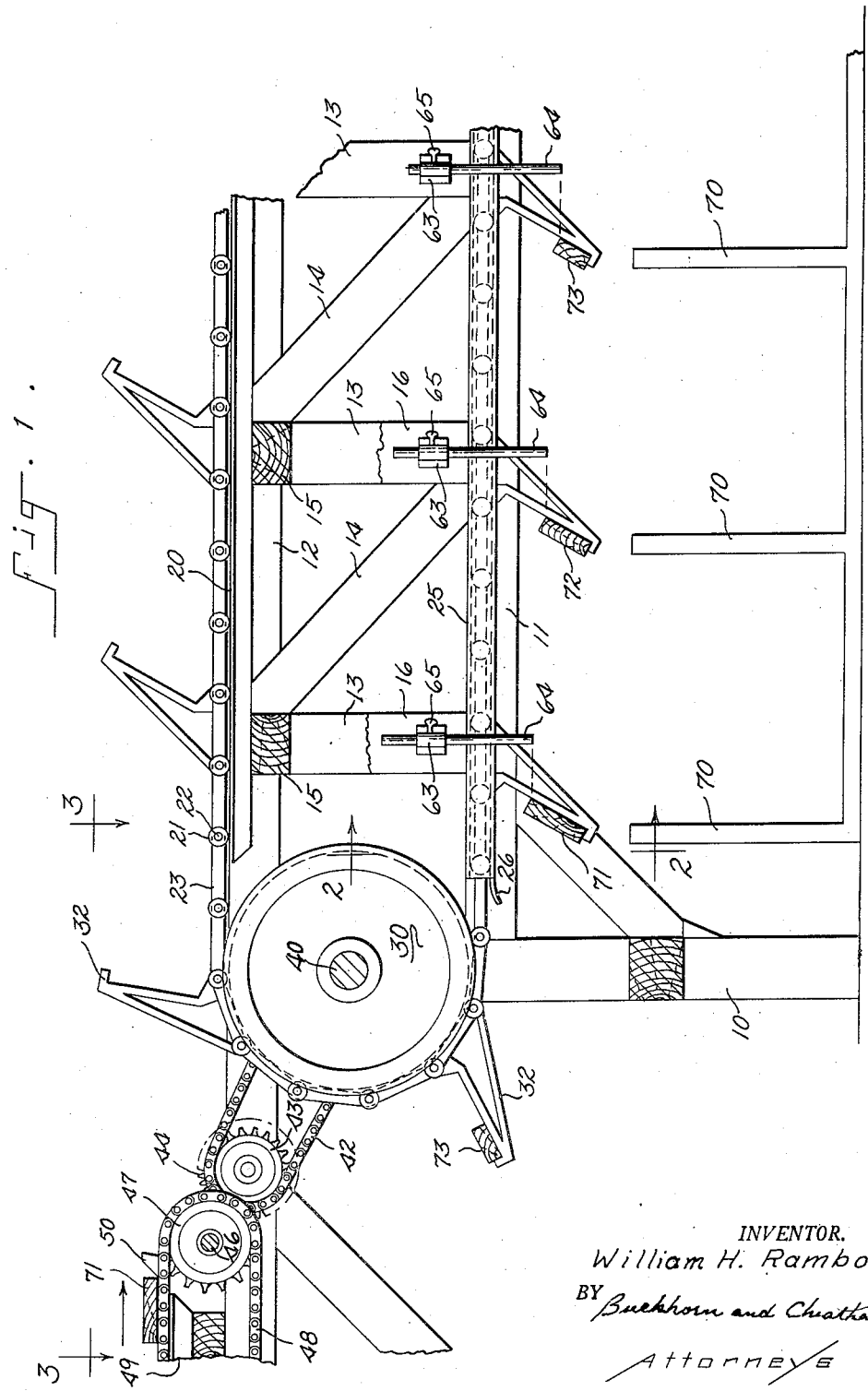

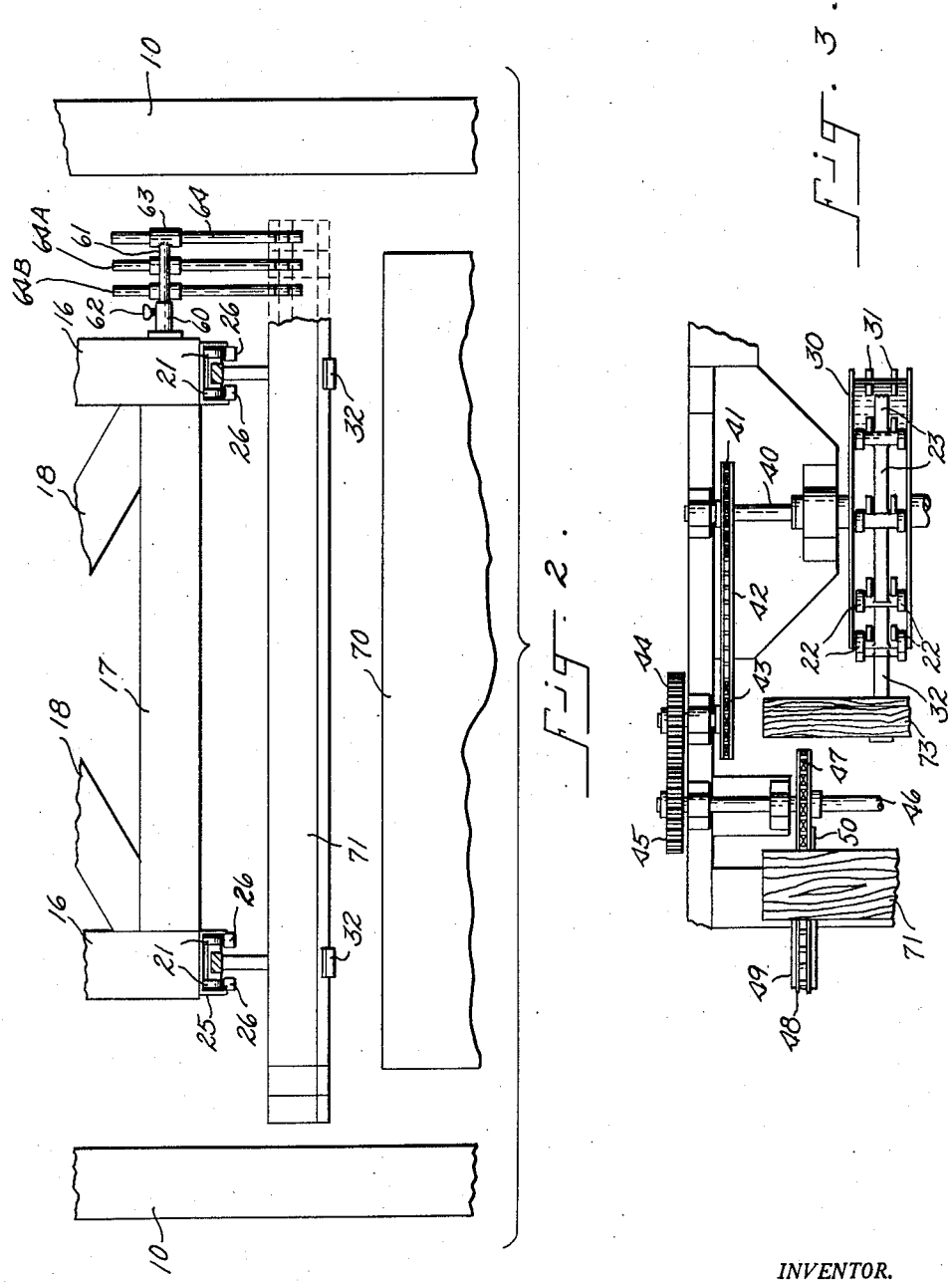

INVENTOR.
William H. Rambo
BY Buckhorn and Cheatham
Attorneys

Sept. 1, 1959   W. H. RAMBO   2,902,150
MECHANISMS AND METHODS FOR THE SORTING OF LUMBER
Filed Oct. 29, 1954   4 Sheets-Sheet 4
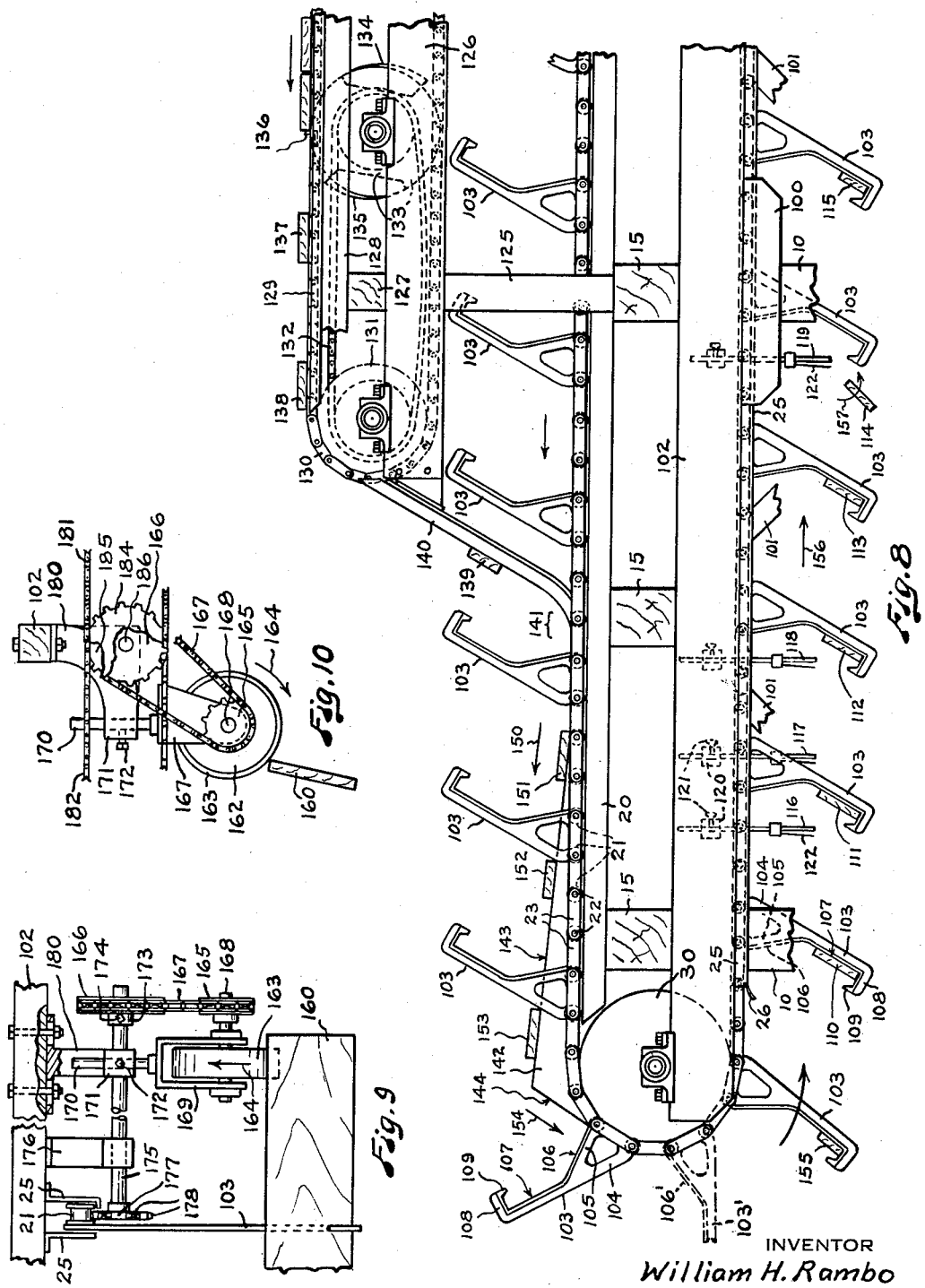
INVENTOR
*William H. Rambo*
BY
*Gilbright Arnold*
ATTORNEY

United States Patent Office 2,902,150
Patented Sept. 1, 1959

2,902,150

MECHANISMS AND METHODS FOR THE SORTING OF LUMBER

William H. Rambo, Portland, Oreg.

Application October 29, 1954, Serial No. 465,593

16 Claims. (Cl. 209—90)

The present invention and discovery relates to the art of lumber sorting mechanism whereby different types of lumber may be sorted according to several selected dimensions, grades, or a combination thereof.

The present invention and discovery has for one of its principal objects the elimination of all complicated electrical relays or other control systems, or mechanical linkages between a sensing element which senses the presence on a conveyor of lumber of one type or another and the means for ejecting the lumber from the conveyor into individual bins or stalls in accordance with their grade or size, the present invention comprising means whereby the sensing element accomplishes the ejection of the lumber from the conveyor. Accordingly, the present invention comprises means whereby the sorting of the different grades and sizes of lumber is positive and immediately accomplished.

A primary object of my invention and discovery is to sort lumber mechanically and automatically and thereby reduce or eliminate in large measure the present high cost of manually handling and sorting lumber. Furthermore, a primary object is to so handle and sort the lumber at a greater speed than at present. In a lumber plant space is at a premium, and all equipment must be constructed in as compact a manner as possible. Particularly is this true where equipment is to be added to an already operating plant.

The units or boards of lumber, according to my invention, may be best fed to the upper flight of an endless conveyor in disposing the same in uniform spaced relation, and then can best be discharged while on the lower or return flight of said endless chain. It is a fundamental object of my invention to utilize the turning of the endless conveyor in descending and reversing its direction of travel from the upper flight to the lower flight in positively positioning the lumber units being sorted on depending lumber supports mounted on the conveyor.

In providing relatively high speed of operation for reducing costs, it is necessary to dislodge or upset the lumber from the supports mounted on the conveyor in a relatively restricted space of travel, in having the units deposited in their proper respective and predetermined locations. I have discovered a method whereby this may be definitely accomplished by the following steps: positioning the board in an inclined position on an open arm support; from this position, I cause the board or unit to be dislodged by the gauging means with a positive force of a magnitude which will, in the very act of dislodgment or freeing the unit from the support, immediately impart thereto a spinning action about its longitudinal axis in upsetting said lumber. Thus, the conveyor means is free to maintain its fast rate of travel while the board is free to fall at its point of discharge.

A further primary object of my invention is to provide a sorting mechanism which is readily adaptable to the needs of any particular lumber plant—the number of classifications, i.e., stations, may vary from very few to more than a thousand. A particular object of my invention is that the same be of simple construction so that its maintenance is relatively low in cost.

The above mentioned general objects of my invention, together with others inherent in the same, are attained by the mechanism illustrated in the following drawings, throughout which like reference numerals indicate like parts:

In the drawings:

Figure 1 is a side view of a portion of a sorting apparatus embodying one form of the present invention;

Fig. 2 is a vertical section taken generally along line 2—2 of Figure 1;

Fig. 3 is a partial plan view taken generally along line 3—3 of Figure 1;

Fig. 6 is a partial view showing one form of means for counting the number of lumber units of each dimension and/or grade ejected into an individual storage bin or the like;

Fig. 8 is a partial side view illustrating modified sorting and feeding apparatus embodying further forms of the present invention, serving to also illustrate yet another form of lumber unit counting device associated with the various gauging members;

Fig. 9 is an enlarged partial end view, illustrating a modified form of gauging member wherein the upsetting action thereof is augmented by counter-rotation of a generally circular contact member; and Figure 10 is an enlarged partial side view, illustrating a further modification of the rotating type of gauging member presented in Fig. 9.

Figure 4:
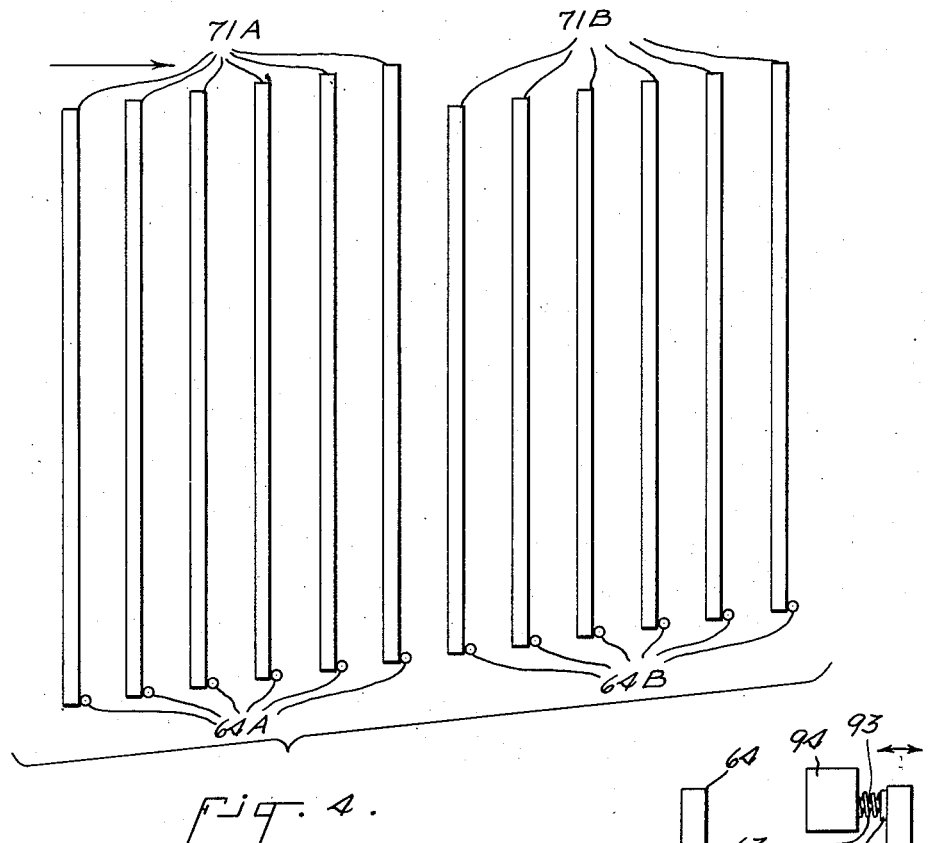
Fig. 4 is a diagrammatic view, showing schematically how lumber may be sorted as to length and grade in one machine, according to my invention.

In the drawings there is illustrated a supporting framework including uprights 10 supporting spaced lower longitudinal beams 11 and spaced upper longitudinal beams 12, the beams being joined by truss members 13 and 14 to provide a rigid structure. Horizontal cross-beams join the upper beams 12 and support a depending frame of intermediate width including short vertical posts 16 connected by horizontal braces 17 and truss members 18. The cross-members 15 support longitudinally extending steel rails 20 forming tracks for supporting pairs of rollers 21 mounted at the ends of each pin 22 connecting links 23 of a laterally spaced pair of conveyor chains, one such chain being located at each side of the frame. The vertical posts 16 support lower guides 25 having inwardly directed flanges 26 at the lower edges of their vertically positioned sides whereby substantially boxlike tracks with longitudinally extending, downwardly directed slots are provided at each side of the frame immediately beneath the rails 20 for supporting the lower, horizontal flights of the chains. Preferably the ends of the flanges 26 are directed downwardly at the entering ends of the box guides so as to make certain that the track rollers will be directed thereinto as they leave the flanged drums 30 over which the conveyor chains are directed. The flanged drums 30 are provided with suitable lugs 31 so that they act as sprockets for advancing the chains. Spaced pairs of the crosspins of the chains support the legs of a plurality of supports 32 of equal length which project outwardly a considerable distance from the chain, being of sufficient length to support the widest board to be sorted and having abutments at their tips to engage the outer edges of the boards. The hooks are so directed that when the return flights of the chains are engaged in the box guides 25 the boards rest at a slight angle from the vertical on the outer hook tips so that their upper edges project toward the box guides and so that they may be removed from the conveyor by being tipped rearwardly beyond the vertical.

Boards are placed on the hooks 32 by any suitable mechanism such as illustrated in Figs. 1 and 3, wherein it is seen that the shaft 40 supporting the flanged drums 30 carries a sprocket 41 about which is trained a short, endless sprocket chain 42 directed around a sprocket 43 on an extension of the frame. The sprocket 43 is connected to a short shaft upon which is fixed a gear 44 meshing with a second gear 45 on the end of a shaft 46. The shaft 46 is fixed to sprockets 47 about which are trained endless sprocket chains 48 sliding over guide rails 49 forming a part of a sorting table. The chains are provided with positioning lugs 50 having rearwardly sloped surfaces against which the sorter positions the forward edges of the boards. The sorting table chains 48 and the sorter chains 23 are thus operated in synchronism so that a board positioned against the rear surfaces of the lugs 50 will be brought forward in time to slide onto the lowering upper surfaces of a laterally aligned pair of supports 32 and thus be horizontally positioned thereon to be carried forward beneath the box guides 25.

The upright frame members 16 support a plurality of laterally projecting, horizontally positioned, tubular supports 60 in each of which is mounted a rigid rod 61 retained in laterally adjusted position by suitable means such as the thumbscrew 62. At the end of each rod there is mounted a short sleeve 63 in which is positioned a vertically depending, rigid rod 64, the rod being retained at a vertically adjusted position by means such as setscrew 65. As seen in Figure 1, the lower tip of each of the rods 64 may be so positioned as to engage the upper edge of a board of a certain width whereby the various widths of boards will be swept off into stalls such as represented by the upright walls 70. The arrangement is such that the widest board 71 will be engaged by the first rod and dropped into the first stall, then the next widest board will be engaged by the second rod and swept off into the second stall, the third widest board 73 engaged by the third rod 64, and so on.

Fig. 2 illustrates the fact that the same mechanism may be utilized to sort lumber of different quality as well as different widths, this being arranged by adjustably positioning the rods 64 laterally with respect to the box guides. Thus there may be a first series of rods longitudinally aligned with each other and adjustably arranged in step relation to each other, as indicated at 64 in Fig. 2, this first series to engage boards having their left ends positioned outward to the greatest extent from the left box guide 25, this having been accomplished by the sorter so arranging the boards on the sorting table conveyor chains 48. This could be followed by a second series indicated at 64A, each rod of the second series being vertically positioned in accordance with the vertical positioning of the first series, but all of the second series being longitudinally aligned a short distance inwardly from the first series thereby to engage second-grade lumber of different widths. A third similar series is indicated at 64B in Fig. 2. It is to be appreciated that the number of rods and the number of series thereof could be increased in accordance with the desires of the operator.

In Fig. 4 there is a schematic plan view illustrating the operation of the machine for sorting lumber according to length as well as some other selected characteristic such as its width or grade. The figure illustrates a series of boards 71A of one length which are so adjusted as to engage a first series of rods 64A, and a second series of boards 71B of a shorter length adapted to be engaged by a second series of rods 64B. It is to be appreciated that the rods 64A could be adjusted vertically so as to sort six different widths of lumber, in which case each of the rods would be at a different height. However, the rods 64A could be vertically adjusted so that the first three rods would be at one height to engage lumber of the same length and width, but to sort different grades due to their lateral offset relation to each other, and the fourth, fifth and sixth rods 64A could be at the same height but at a different level from the first three so as to engage and sort boards of a different width from those engaged by the first three rods. Likewise, the series 64A could all be at the same level or at different levels according to the demands at the time.

Figure 5:
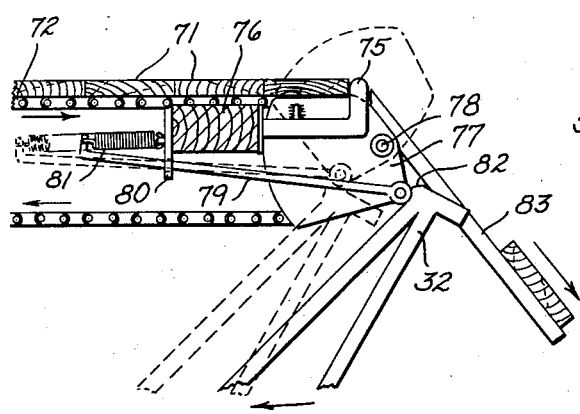
Fig. 5 is a partial view showing a modified feeding device for the machine.

Fig. 5 illustrates a different form of mechanism for placing the boards on the conveyor chain. In this figure the boards 71 are illustrated as being advanced by an endless chain 72 which frictionally engages the lower surfaces of the boards and advances them transversely across a sorting table. When the boards reach the end of the sorting table they are arrested by an abutment 75 projecting from a beam 76 forming a portion of the frame of the sorting table. An irregularly shaped transfer member 77 is pivotally mounted on a transverse rod 78 and normally lies alongside of the upper flight of the chain 72 so that the foremost board will be advanced onto its upper surface. The transfer member 77 is pivotally connected to a rod 79, which projects through an opening in a guide plate 80 mounted on the beam 76, and which is connected at its rear end to a tension spring 81 which normally holds the transfer member in position alongside of the chain 72. The supports 32 which project from the sorting machine conveyor are provided with hook abutments 82 at their outer ends, which engage a suitable portion of the transfer member and rock the same upwardly to lift the boards one at a time around the abutment 75, such movement being accompanied by tensioning of the spring 81 which functions to return the transfer member to its proper position as soon as the support 32 has passed beyond engagement therewith. The boards may be dropped onto a suitable set of guide ramps 83 which direct the board into the space ahead of the succeeding support 32. The boards will lie on the conveyor links 23 until they pass around the drum 30, whereupon they will slide onto the supports 32 to be engaged by the outer flanges thereof and carried into engagement with the proper sorting rod.

Figure 6:
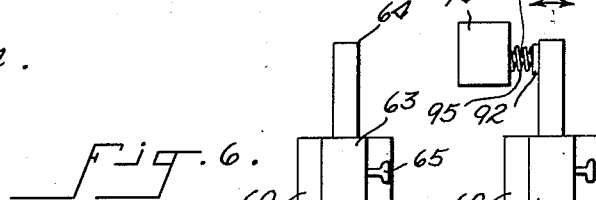

Fig. 6 illustrates one form of means whereby the number of boards dropped into each bin may be counted, the counting mechanism being provided for the purpose of calling attention to the accumulation of a desired number of a certain type of board. The counting mechanism could be arranged to operate a warning device of any suitable nature, or to actuate means for removing the accumulated package of lumber from the sorting bin. In this figure it is seen that the lower end of the rod 64 may support a suitable counter 90 having a star wheel actuator 91, the arms of which are arranged at the level of the lower tip of the rod 64 so that a board which will be removed by the particular arm 64 will operate the counter.

Figure 7:
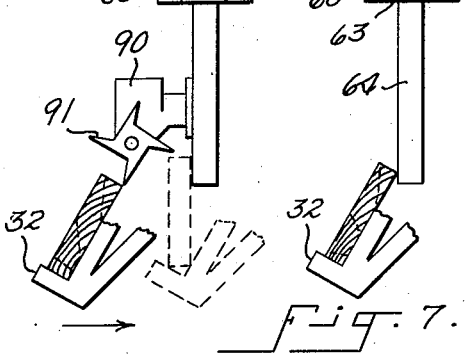
Fig. 7 is a similar view of a modified form of counting means.

Fig. 7 illustrates a modified form of the mechanism wherein the rod 64 is mounted so as to be capable of slight rocking movement as indicated schematically by the double-ended arrow at the upper end thereof. The upper end of the rod 64 engages a movable bar 92 pivotally or otherwise movably attached to some suitable portion of the frame at such a level as to engage the upper end of the rod 64 at any height to which it may be adjusted. The bar 92 engages a suitable plunger 93 which operates the counter 94. A spring 95 normally holds the plunger outward and the bar 64 at one limit of its possible movement. The spring 95 is of such strength as to return the rod and bar 92 to their normal positions, but will yield to permit actuation of the counter when the rod 64 is engaged by a board on one of the supports, the rod 64 thereupon rocking through a short arc prior to resisting further forward advance of the board.

Fig. 8 is a partial view in side elevation of a modified form of the invention, and particularly illustrates an open arm support construction, another arrangement of lumber feeding means, and a further arrangement of the counting devices on the gauging members.

Turning to a further and more detailed consideration of the form of invention illustrated in Fig. 8, the improved machine comprises supporting framework including uprights 10, suitable base members 100 and bracing members 101, as desired, and horizontal cross-beams 15 mounting longitudinally extending steel rails 20 in turn forming tracks for supporting bars of rollers 21 mounted in the ends of each pin 22 connecting links 23 of a laterally spaced pair of conveyor chains, one such chain being located at each side of the supporting frame, generally in the manner of the supporting structure and conveyor arrangement illustrated in Figs. 1 through 3. The supporting structure illustrated in Fig. 8 also includes longitudinally extending cross members 102 supporting flanged drums 30, one being shown, of suitable design in the manner of corresponding structure in the arrangement of Figs. 1 through 3, to act as sprockets for advancing the chains. Also mounted on cross-beam 102 are box guides 25 having inwardly directed flanges 26, said lower guides 25 being of design to provide longitudinal stability to the links 23 coursing therethrough. Mounted in the manner shown on spaced links 23 of the conveyor chains are a plurality of transversely aligned open arm lumber supports 103 having stabilizing leg portions 104 and 105, the latter of which comprises a guide portion 106 extending outwardly from the conveyor chains. Open arm supports 103 further comprise a lumber supporting face 107 in the outer portion thereof, which lumber supporting faces 107 are arranged at an acute angle and extend rearwardly from the path of travel of the conveyor chains. In the modified open support construction illustrated in Fig. 8, the support 103 is further provided with an abutting portion 108 in turn mounting an inwardly directed edge 109, said abutment 108 and edge 109 constituting what may be termed a reverse bend, anti-dislodging portion or hook portion of the open arm lumber supports and serving to positively retain and support the lower edges of lumber units 110 through 115 in equi-spaced relation with respect to the conveyor chains during course of travel of the latter through guides 25, except when such lumber units are dislodged or upset by the gauging members 116 through 119 in the manner hereinafter indicated.

Also mounted on longitudinal cross member 102 are a plurality of vertically and laterally adjustable gauging members 116 through 119, a suitable mode of vertical adjustment being illustrated by sliding contact of gauging member 116 through bearing blocks 120 having set screws 121 threaded therein. It will be readily understood that bearing blocks 120 are suitably mounted for lateral adjustment with respect to cross member 102, or may be of predetermined lateral dimension, to provide for lateral spacing of gauging members 116 through 119 in the general manner indicated for supporting elements 60 through 63 for gauging members 64 in the arrangement illustrated in Fig. 2.

Shown mounted on the contacting edge of gauging members 116 through 119 are spring pressed sensing elements or fingers 122 which are depressed toward the respectively associated gauging members 116 through 119 when the latter contact the upper portion of lumber units carried by support arms 103. Sensing elements 122 will be understood to each operate a microswitch or other counter indicating or accumulator control circuit, as desired. It will also be understood that various gauging elements 116 through 119, four being shown by way of example, may be arranged in a predetermined manner to provide appropriate sorting by grade and/or dimension in the general manner set forth in connection with operation of the machines according to the present invention in Fig. 4.

The mechanism for feeding lumber in spaced relation illustrated in conjunction with the lumber sorting mechanism in Fig. 8 is generally of the type disclosed and claimed in the copending application of William H. Rambo and Theodore A. Brandon, Serial No. 394,055, filed November 24, 1953, and entitled Automatic Unit Feeding and Spacing Mechanism, to which reference is to be made for a fuller explanation of the operation thereof. This lumber feeding mechanism, as typically utilized in the embodiment of the present invention illustrated in Fig. 8, is supported in superposed relation with respect to the lumber sorting mechanism by framework including uprights 125, longitudinal cross-beams 126, transverse cross-beams 127, and longitudinal supports 128 in turn mounting longitudinally extending steel rails 129 forming tracks for support of conveyor chains 130 driven by sprockets 131, one being shown, through action of suitable lug means, not shown. Also driven from sprocket 131 through suitable linkage such as chain 132 is cam wheel 133 mounting a pair of adjustable cam elements 134 and 135. Functioning in cooperation with cam wheel 133 is a stationary stop 136 mounted to extend slightly above the path of travel of conveyor chain 130 in the manner shown. Conveyor chain 130 is driven through sprockets 131 in geared relation to the conveyor chains of the lumber sorting mechanism in a manner to discharge individual lumber units 137, 138, and 139, three being indicated by way of example, to skid means 140 which in turn deliver the lumber units against the lumber sorter conveyor chains and deposit one such lumber unit between each successive transverse pair of open arm lumber supports 103 at a feeding station, generally indicated at 141. Of course, any desired added, i.e. intermediate, number of lumber supports 103 may be disposed transversely on added conveyor chains.

In Fig. 8, the lumber sorting mechanism is also provided in the area of the upper flight of the lumber sorter conveyor chains following feeding station 141 with transversely arranged slideways 142 extending above the upper flight of said conveyor chains in the manner shown, said slideways 142 each having a leading inclined surface 143 and a trailing declined surface 144, the function and operation of which are set forth more fully hereinafter.

Giving consideration to the general operation of the embodiment of the invention illustrated in Fig. 8, conveyor 130 of the lumber feeding unit and the conveyor chains of the lumber sorting unit are driven in geared relation so that, by operation of cam wheel 133 and stop 136, lumber units are delivered in spaced relation to feeding station 141, three such lumber units being shown at 137, 138 and 139 by way of example, at a rate to interspace lumber units between each successive transverse pair of supports 103.

As the lumber sorter conveyor chains progress, the lumber units interspaced between the transverse pairs of open arm supports 103 proceed to a position on the inclined surface 143 of slideway 142, such movement and position being indicated at 150 and 151 respectively. As a lumber unit in the position of lumber unit 151 becomes supported on inclined surface 143, the lumber unit is gradually raised above the conveyor chains and thereupon pushed by contact with the leading edge of the following pair of open arm supports 103 to successive positions two of which are shown by lumber units 152 and 153 along inclined surface 143. As a given lumber unit, 153 for example, passes the apex of slideway 142, it is tipped downwardly by the force of gravity and falls in the general direction indicated at 154 along declined surface 144 of said slideway 142, the path of fall of the lumber unit continuing until contact is made with the guide surfaces 106 of the preceding pair of open arm supports which are at such time in the position fragmentarily shown in dotted line at 103' in Fig. 8. In this connection, it is to be noted that when a given guide portion 106 is in the position shown in dotted line and indicated at 106', such guide portion 106' is approximately in parallel alignment with said declined surface 144 of slideway 142. It has been found that such approximately parallel alignment between said declined surface 144 and guide portion 106' advantageously provides smooth and even path of fall for the lumber unit, affording subsequent contact thereof with the open arm support 103 in a uniform manner and facilitating transfer thereof to supported position on support face 107 and abutment 108, such supported position being shown by lumber unit 55, by way of example. It has been further demonstrated that the reverse bend afforded by hook portion 109 on abutment 108 also contributes to smooth and efficient transfer of the lumber units to supported position on the open arm supports 103 in their depending path of travel by eliminating any tendency for occasional misalignment of the lumber units on open arm supports 103.

As the lumber units proceed through successive positions along the path of travel generally indicated at 156 and shown by lumber units 110 through 115, the operation of gauging members 116 through 119 is such that, by their predetermined position, such gauging members are interposed in the path of travel of said lumber units to upset a predetermined dimension of lumber unit from the open arm supports at a predetermined location.

It is an important feature of the present invention that this upsetting action occurs in a very positive manner and causes a given lumber unit, unit 114 being shown by way of example, to be upset with an immediate spinning action or force, or immediate rotary motion through a degree of turning about its longitudinal axis in disposing the unit in space entirely free of its support, as schematically indicated at 157, Fig. 8. By the manner of discharging or dislodging the lumber units from the open arm supports, as here presented, it is further noteworthy that the point of fall of the lumber units is necessarily substantially directly below the point of upset for a wide range of conveyor speeds, thus making possible relatively high conveyor speeds without detriment to the sorting action. In practice, conveyor speeds of the order of 120 feet per minute and ranging as high as 200 or more feet per minute are thus rendered practical, with corresponding increased efficiency in high volume operation. Considered in a somewhat different light, from the upsetting arrangement occasioned by the open arm supports and gauging members of the present invention, it will be readily understood that the upset or discharge time of the lumber units from the open arm supports is very materially reduced from the time normally required for discharge of unit sorting arrangements of the type heretofore available.

Fig. 9 serves to illustrate in partial end view another modified form of gauging member, serving the particularly advantageous purpose of positively augmenting the spinning action afforded the lumber unit during upset. As shown, a lumber unit, 160, in supported position on open arm support 103 at the point of upset is contacted by a rotatable gauging member 162, desirably having a resilient rim portion 163 to prevent any tendency to mar lumber unit 160. Said rotatable gauging member 162 is rotated is indicated at 164 in a direction generally opposite from the path of travel of the lumber unit through positively driven sprocket means 165 and 166 with suitable drive linkage surface chain 167. Rotatable gauging member 162 is in turn mounted on a suitable axle 168 supported by an open ended frame 169, in turn mounted for vertical and lateral adjustment through means of rod 170, bearing portion 171, and set screw 172 (also support 180). Sprocket 166 is also provided for lateral adjustment through action of mounting sleeve 173 and set screw 174, affixing said sleeve 173 and sprocket 166 to axle 175, in turn supported by bearing surfaces provided in a depending support 176. Axle 175 is positively rotated through action of spur gear 177 having suitable lugs 178 to engage the adjacent lumber sorter conveyor chain rollers 21, conveyor chain guideway 25 being provided with a cut out portion to allow such engaging, as shown.

Fig. 10 illustrates in partial side view a modified from of drive mechanism for rotatable gauging member 162, with certain drive elements shown in partial section, like elements in Fig. 9 being shown with like reference numerals.

By virtue of this modified drive arrangement, drive sprocket 166 may be positively driven at any selected speed independently of the lumber sorter conveyor chain by suitable chain linkages 181 and 182 respectively connecting second and third sprockets 184 and 185 adjacent to sprocket 166, said linkages 181 and 182 being linked to similarly arranged sprockets driving similar gauging member driving elements longitudinally spaced above the path of travel of the lumber units. By the arrangement presented in Fig. 10, the speed of rotation of the gauging member 162 may be selectively varied and readily maintained at speeds substantially greater than the speed of travel of the sorter conveyor chain, thus providing gauging member driving mechanism capable of great flexibility of operation, readily adaptable to whatever dislodging and spinning action is most advantageous for a particular range of lumber unit dimensions.

While in Figs. 8, 9 and 10, applications of my invention are shown embodying gauging means for widths of units, it is to be understood that said gauging means may be postioned in gauging lengths of units, either separately or in conjunction with widths as hereinabove set forth respectively Fig. 4. Also, likewise said gauging means may be employed in sorting species and grades and thickness of boards by employing longitudinal positioning of the pins.

While the present invention has been described in the light of various constructional arrangements and methods of operation thereof, it is to be understood that the invention is not limited to the constructional details and manner of operation shown and described by way of example. Accordingly, various modifications, such as use of conveyors or drive linkages of unitary construction, or use of other lumber feeding mechanisms will be apparent to those skilled in the art and may be adopted without departing from the spirit and scope of the invention as defined in the following claims.

This application is a continuation-in-part of my co-pending application Serial No. 203,929, filed January 2, 1951, now abandoned.

I claim:

1. A lumber sorting mechanism comprising a laterally spaced pair of endless conveyor chains in conveying lumber normal to its length; a plurality of open arm lumber supports of equal length mounted on said conveyor chains and each of said supports having a lumber supporting face for the most part inclined to the longitudinal axis of said conveyor chain at an acute angle and rearwardly to the direction of travel, the supports of one chain being transversely aligned with the supports on the other chain in positioning lumber individually on transversely aligned pairs of said supports when said supports are dependent from horizontal flights of said conveyor chains; horizontal guide means for the conveyor chains in maintaining the supports when in dependent position at their predetermined acute angle to the longitudinal axis of the conveyor chain; and a plurality of longitudinally spaced rigid members mounted adjacent the path of travel of said open arm supports in engaging position with the upper edge portions of the lumber carried by said supports, each of said rigid members having its lumber engaging portion adjustable at levels different than the other rigid members in contacting lumber of different widths in tipping said lumber from said supports at longitudinally spaced points.

2. A lumber sorting mechanism comprising a laterally spaced pair of endless conveyor chains in conveying lumber normal to its length; a plurality of open arm supports of equal length mounted on said conveyor chains and each of said supports having a lumber supporting face for the most part inclined to the longitudinal axis of said chain at an acute angle and rearwardly to the direction of travel and of a length permitting the lumber to slide over said supporting face toward the chain when the support is being loaded with said lumber and away from said chain in sliding to carrying position, the supports of one chain being transversely aligned with the supports on the other chain in positioning lumber individually on transversely aligned pairs of said supports when said supports are dependent from horizontal flights of said conveyor chains; horizontal guide means for the conveyor chains in maintaining the supports when in dependent position at their predetermined acute angle to the longitudinal axis of the conveyor chain; and a plurality of longitudinally spaced rigid members mounted adjacent the path of travel of said open arm supports in engaging position with the upper edge portions of the lumber carried by said supports, each of said rigid members having its lumber engaging portion adjustable at levels different than the others in contacting lumber of different widths in tipping said lumber from said supports at longitudinally spaced points.

3. A lumber sorting mechanism comprising a laterally spaced pair of endless conveyor chains in conveying lumber normal to its length; a plurality of open arm supports of equal length mounted on said conveyor chains and each of said supports having a lumber supporting face for the most part inclined to the longitudinal axis of said chain at an acute angle and rearwardly to the direction of travel and of a length permitting the lumber to slide over said supporting face toward the chain when the support is being loaded with said lumber and away from said chain in sliding to carrying position, the supports of one chain being transversely aligned with the supports on the other chain in positioning lumber individually on transversely aligned pairs of said supports when said supports are dependent from horizontal flights of said conveyor chains; horizontal guide means for the conveyor chains for maintaining the supports when in dependent position at their predetermined acute angle to the longitudinal axis of the conveyor chain; and a plurality of longitudinally spaced rigid members mounted adjacent the path of travel of said open arm supports in engaging position with the upper edge portions of the lumber carried by said supports, each of said rigid members having its lumber engaging portion adjustable laterally and vertically at levels different than the other rigid members in contacting lumber of different lengths and widths in tipping said lumber from said supports at longitudinally spaced points.

4. A lumber sorting mechanism comprising a laterally spaced pair of endless conveyor chains in conveying lumber normal to its length; a plurality of open arm lumber supports of equal lengths mounted on said conveyor chains and each of said supports having a supporting face inclined to the longitudinal axis of said chain at an acute angle and rearwardly to the direction of travel, said face having a right angle abutment end opposite its mounting in conveying lumber with at least one edge variably spaced from the line of travel of said supports; horizontal guide means for the conveyor chains in maintaining the supporting faces when in dependent position at their predetermined acute angle to the longitudinal axis of the conveyor chain; a plurality of longitudinally spaced rigid members mounted adjacent the path of travel of said open arm supports in engaging position with the upper edge portions of the lumber carried by said supports, each of said rigid members having its lumber engaging portion adjustable at levels different than the other rigid members in contacting lumber of different widths in tipping said lumber from said supports at longitudinally spaced points.

5. A lumber sorting mechanism comprising a laterally spaced pair of endless conveyor chains in conveying lumber normal to its length, said chains having a feeding end towards which said chains move in their upper flight; a plurality of open arm lumber supports of equal length mounted on said conveyor chains, each of said supports having a lumber supporting face inclined to the longitudinal axis of said chain at an acute angle and rearwardly to the direction of travel with an abutment at the end of said support remote from the chain; horizontal guide means for the conveyor chains in maintaining the supports when in dependent position at their predetermined acute angle to the longitudinal axis of the conveyor chain; a plurality of longitudinally spaced rigid members mounted adjacent the path of travel of said open arm supports in engaging position with the upper edge portion of the lumber carried by said supports; and a lumber feeding means located at the feeding end of the conveyor chains geared with respect to the speed of said conveyor chains to discharge individual pieces of lumber against the conveyor chain after said chain turns from its horizontal flight.

6. A lumber sorting mechanism comprising an endless conveyor for conveying lumber normal to its length; a plurality of open arm lumber supports arranged in transverse alignment on said conveyor, each of said supports having a lumber supporting face inclined to the direction of travel of said conveyor at an acute angle and rearwardly to said direction of travel; guide means for the conveyor arranged to maintain said supports when in depending position at their predetermined acute angle to the direction of travel of the conveyor; and a plurality of spaced gauging members mounted adjacent the path of travel of said open arm supports in engaging position with the upper portions of the lumber carried by said supports, each of said members having its lumber engaging portion adjustable at levels different than the other gauging members in contacting lumber of different widths in upsetting said lumber from said supports at spaced points along said conveyor.

7. A lumber sorting mechanism comprising a laterally spaced pair of endless conveyor chains in conveying lumber normal to its length; a plurality of open arm supports respectively arranged in transverse alignment on said conveyor chains, each of said supports having a lumber supporting face inclined to the longitudinal axis of said chains at an acute angle and rearwardly to the direction of travel and of a length permitting the lumber to slide over said supporting face toward the chain when the support is being loaded with said lumber and away from said chain in sliding to carrying position when said supports are in depending position; horizontal guide means for the conveyor chains in maintaining the supports when in dependent position at their predetermined acute angle to the longitudinal axis of the conveyor chain; and a plurality of longitudinally spaced gauging members mounted adjacent the path of travel of said open arm supports in engaging position with the upper portions of the lumber carried by said supports, each of said gauging members having its lumber engaging portion adjustable at levels different than the others in contacting lumber of different widths in upsetting said lumber from said supports at longitudinally spaced points.

8. A lumber sorting mechanism comprising a laterally spaced pair of endless conveyor chains for conveying lumber normal to its length; a plurality of open arm supports of equal length mounted on said conveyor chains, each of said supports having a lumber supporting face inclined to the longitudinal axis of said chain at an acute angle and rearwardly to the direction of travel, the supports of one chain being transversely aligned with the supports on the other chain in positioning lumber individually on transversely aligned pairs of said supports when said supports are dependent from horizontal flights of said conveyor chains; horizontal guide means for the conveyor chains in maintaining the supports when in dependent position at their predetermined acute angle to the longitudinal axis of the conveyor chain; and a plurality of longitudinally space gauging members mounted adjacent to the path of travel of said open arm supports in engaging position with the upper portions of lumber carried by said supports, each of said gauging members having its lumber engaging portion adjustable laterally and vertically at positions different from other gauging members in contacting lumber of different dimensions in upsetting said lumber from said supports at longitudinally spaced points.

9. A lumber sorting mechanism comprising a laterally spaced pair of endless conveyor chains in conveying lumber units normal to their length dimension; a plurality of open arm lumber supports of equal length mounted on said conveyor chains, each of said supports having a supporting face inclined to the longitudinal axis of said chain at an acute angle and rearwardly to the direction of travel, said supporting face having a right angle abutment opposite the support mounting for supporting and conveying lumber with at least one edge of each of said lumber units variably spaced from the line of travel of said support abutments; horizontal guide means for the conveyor chains in maintaining the support faces when in dependent position at their predetermined acute angle and position with respect to the longitudinal axis of the conveyor chains; a plurality of longitudinally spaced gauging members each mounted adjacent the path of travel of said open arm supports in contacting position with the upper portions of certain of the lumber units carried by said supports, each of said gauging members having its lumber unit engaging portion adjustable at levels different than other gauging members in contacting lumber units of different widths in upsetting said lumber units from said supports at longitudinally spaced points.

10. A lumber sorting mechanism comprising a laterally spaced endless conveyor arranged in upper and lower flights for conveying lumber units normal to their length; a plurality of pairs of open arm lumber supports of equal length transversely mounted on said conveyor, each of said supports having a lumber supporting face inclined to the longitudinal axis of said conveyor at an acute angle and rearwardly to the direction of travel thereof; horizontal guide means for the lower flight of said conveyor for maintaining the supports when in dependent position at their predetermined angle to the longitudinal axis of the conveyor, and a plurality of longitudinally spaced gauging members mounted adjacent to the path of travel of said open arm supports in engaging position with the upper portions of lumber units carried by said supports, each of said gauging members being adjustable laterally and vertically at positions different from other gauging members in contacting lumber of different dimensions in upsetting said lumber from said supports at longitudinally spaced points.

11. A lumber sorting mechanism according to claim 10, wherein at least one of said gauging members comprises a rotatable contact element in combination with means for rotating said contact element in a direction generally opposite from the direction of travel of said lumber units at the point of contact.

12. A lumber sorting mechanism comprising a laterally spaced endless conveyor arranged in upper and lower flights for conveying lumber units normal to their length, said conveyor having a feeding station past which said conveyor moves in its upper flight; a plurality of pairs of open arm lumber supports of equal length transversely mounted on said conveyor, each of said supports having a guide portion adjacent to and extending from said conveyor and a lumber supporting face inclined to the longitudinal axis of said conveyor at an acute angle and rearwardly to the direction of travel with a reverse bend abutment at the end of said support remote from the conveyor; horizontal guide means for the lower flight of said conveyor for maintaining the supports when in dependent position at their predetermined acute angle to the longitudinal axis of the conveyor; a plurality of longitudinally spaced gauging members mounted adjacent to the path of travel of said open arm supports in engaging position with the upper portion of the lumber units carried by said supports; and a lumber feeding means delivering lumber to said feeding station, said lumber feeding means being geared with respect to the speed of said conveyor to discharge individual lumber units against the conveyor in the area between successive transverse pairs of open arm lumber supports.

13. A lumber sorting mechanism according to claim 12, wherein the upper flight of said conveyor chains following said feeding station is provided with a pair of transversely arranged slideways extending above said conveyor chains, said slideways each having a leading inclined surface serving to gradually raise the lumber above the conveyor chains, over which inclined surfaces the lumber unit is pushed by contact with the leading edge of the following pair of open arm supports, said slideways each further having a trailing declined surface in approximate parallel alignment with the guide portions of the preceding pair of open arm supports at the time of fall of the lumber unit from said slideways to supported position on said preceding pair of open arm supports.

14. The method of sorting lumber, comprising substantially horizontally conveying lumber units through a predetermined path of travel as individual units in spaced relation on inclined, open armed supports providing a substantially upright support for each unit; interposing in the path of travel thereof gauging members at spaced intervals in the direction of feed arranged to contact and dislodge lumber units of different predetermined dimensions from said supports; and discharging each said lumber unit from said support by a single blow-like contact from said gauging member, said blow-like contact being applied in a direction opposite to the direction of feed to the upper edge portion of said unit and substantially above the longitudinal axis of said lumber unit to provide, in combination with said support, a direct turning moment of force in said discharging and thereby to impart to said unit an immediate spinning and revolving movement to cause each said lumber unit to fall into a location predetermined in accordance with its gauged dimension and substantially directly below the point of gauging contact.

15. The method of sorting lumber, comprising substantially horizontally conveying lumber units through a predetermined path of travel as individual units in spaced relation on inclined, open armed supports providing a substantially upright support for each unit; interposing in the path of travel thereof gauging members at spaced intervals in the direction of feed arranged to contact and dislodge lumber units of different predetermined dimensions from said supports; and discharging each said lumber unit from said support by a single blow-like contact from said gauging member, said blow-like contact being applied in a direction opposite to the direction of feed to the upper edge portion of said unit and substantially above the longitudinal axis of said lumber unit and the bottom edge of said unit being momentarily retained by its support to provide, in combination with said support, a direct turning moment of force in said discharging and thereby to impart to said unit an immediate spinning and revolving movement to cause each said lumber unit to fall into a location predetermined in accordance with its gauged dimension and substantially directly below the point of gauging contact.

16. The method defined by claim 14 combined with the further step of employing said blow-like contact to count the number of lumber units displaced.

References Cited in the file of this patent

UNITED STATES PATENTS

| | | |
|---|---|---|
| 1,506,657 | Nordstrom et al. | Aug. 26, 1924 |
| 1,570,094 | Stevens | Jan. 19, 1926 |
| 1,660,179 | Scheidemandel | Feb. 21, 1928 |
| 1,706,632 | Onstad | Mar. 26, 1929 |
| 2,705,072 | Calvin | Mar. 29, 1955 |